(12) United States Patent
Lapidot et al.

(10) Patent No.: US 8,405,573 B2
(45) Date of Patent: Mar. 26, 2013

(54) DISTRIBUTED HEAD-MOUNTED DISPLAY SYSTEM

(75) Inventors: Zvi Lapidot, Rehovot (IL); Yaakov Amitai, Rehovot (IL); Shmuel Friedman, Nes Ziona (IL)

(73) Assignee: Lumus Ltd., Rehovot (IL)

( * ) Notice: Subject to any disclaimer, the term of this patent is extended or adjusted under 35 U.S.C. 154(b) by 691 days.

(21) Appl. No.: 12/602,643

(22) PCT Filed: Jun. 1, 2008

(86) PCT No.: PCT/IL2008/000738
§ 371 (c)(1),
(2), (4) Date: Dec. 1, 2009

(87) PCT Pub. No.: WO2008/149339
PCT Pub. Date: Dec. 11, 2008

(65) Prior Publication Data
US 2010/0171680 A1    Jul. 8, 2010

(30) Foreign Application Priority Data

Jun. 4, 2007 (IL) .......................................... 183637

(51) Int. Cl.
*G09G 5/00* (2006.01)
(52) U.S. Cl. .................. 345/8; 345/32; 345/48

(58) Field of Classification Search .................. None
See application file for complete search history.

(56) References Cited

U.S. PATENT DOCUMENTS

| 6,421,031 | B1 | 7/2002 | Ronzani et al. | |
|---|---|---|---|---|
| 2005/0248852 | A1 | 11/2005 | Yamasaki | |
| 2006/0052146 | A1 | 3/2006 | Ou | |
| 2006/0061555 | A1 | 3/2006 | Mullen | |
| 2006/0072205 | A1* | 4/2006 | Li et al. ........................ | 359/630 |
| 2006/0103590 | A1 | 5/2006 | Divon | |

FOREIGN PATENT DOCUMENTS

| EP | 1 691 547 | 8/2006 |
|---|---|---|
| JP | 2002-350771 | 12/2002 |
| JP | 2002-368762 | 12/2002 |

OTHER PUBLICATIONS

European Patent Office, PCT Notification of Transmittal of the International Search Report and the Written Opinion of the International Search Authority, mailed Sep. 23, 2008, 12 pages.

* cited by examiner

*Primary Examiner* — Muhammad N Edun

(57) ABSTRACT

There is provided an electro-optical system, including at least two spaced-apart units, a head-mounted display (HMD) unit, having a video signal source, a display source for displaying video signals from the display source, an optical module for projecting video signals from the display source into a user's eye, a driving electronic module, a power supply, and a portable control unit. The two spaced-apart units communicate by a narrowband wireless channel.

21 Claims, 4 Drawing Sheets

DISTRIBUTED HEAD-MOUNTED DISPLAY SYSTEM

FIELD OF THE INVENTION

The present invention relates to distributed head-mounted display (HMD) systems, and in particular, to mobile systems that include two separate units: a head-mounted unit and a portable handheld control unit which communicate by a narrowband wireless channel.

The invention can be implemented to advantage in a large number of imaging applications, such as portable DVDs, cellular phone, mobile TV receiver, video games, portable media players or any other mobile display devices.

BACKGROUND OF THE INVENTION

One important application for compact optical elements is in HMDs wherein an optical module serves both as an imaging lens and a combiner, in that a two-dimensional image source is imaged to infinity and reflected into the eye of an observer. The display source can be directly obtained from either a spatial light modulator (SLM) such as a cathode ray tube (CRT), a liquid crystal display (LCD), an organic light emitting diode array (OLED), a scanning source or similar devices, or indirectly, by means of a relay lens or an optical fiber bundle. The display source comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, however, such a conventional optical module becomes larger, heavier and bulkier, and therefore, even for a moderate performance device, is impractical. This is a major drawback for all kinds of displays and especially in head-mounted applications, wherein the system should necessarily be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive, even for small movements of the optical system relative to the eye of the viewer, and does not allow sufficient pupil motion for comfortable reading of text from such displays.

The teachings included in the publication WO 01/95027, WO 2006/013565, WO 2006/085309, WO 2006/085310 and WO 2007/054928 in the name of Applicant, are herein incorporated by references.

DISCLOSURE OF THE INVENTION

The present invention facilitates the exploitation of very compact light-guide optical element (LOE) for, amongst other applications, HMDs. The invention allows relatively wide FOVs together with relatively large EMB values. The resulting optical system offers a large, high-quality image, which also accommodates large movements of the eye. The optical system offered by the present invention is particularly advantageous because it is substantially more compact than state-of-the-art implementations and yet it can be readily incorporated, even into optical systems having specialized configurations.

A further application of the present invention is to provide a compact display with a wide FOV for mobile, handheld application such as cellular phones. In today's wireless market; sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, solving one of the main limitations for its practical implementation. Thereby, the present invention enables the viewing of the digital content of a full format internet page within a small, handheld device, such as a cellular phone.

A broad object of the present invention is therefore to alleviate the drawbacks of prior art compact optical display devices and to provide other optical components and systems having improved performance, according to specific requirements.

In accordance with the invention there is therefore provided an electro-optical system, including at least two spaced-apart units, comprising a head-mounted display (HMD) unit, having a video signal source, a display source for displaying video signals from the display source, an optical module for projecting video signals from the display source into a user's eye, a driving electronic module and a power supply, and a portable control unit, wherein the two spaced-apart units communicate by a narrowband wireless channel.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of an exemplary prior art LOE;

FIG. 2 illustrates an exemplary prior art embodiment of an LOE embedded in standard eyeglass frame to form a combined handheld HMD unit;

FIG. 3 illustrates a combined handheld HMD system according to the present invention, wherein the connection between the units is effected by a wireless communication channel;

FIG. 4 illustrates an autonomous HMD device;

FIG. 5 illustrates another embodiment of a distributed handheld HMD system according to the present invention, wherein the connection between the units is effected by a narrowband wireless communication channel;

FIGS. 6a and 6b are block diagrams of the wireless communication channels for (a) a conventional cell-phone and (b)

Figure 7:
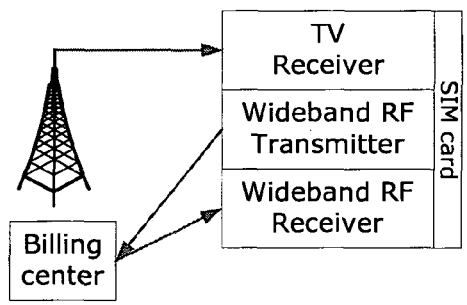
Figure 7:
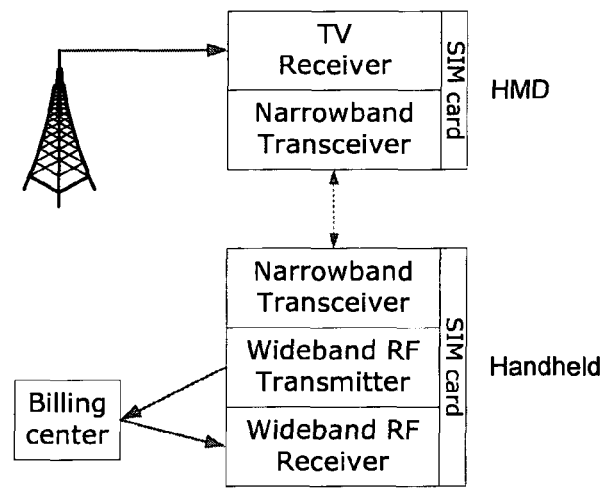

a distributed cell-phone combining a handheld unit with an HMD, according to the present invention, and FIGS. 7a and 7b are block diagrams of the wireless communication channels for (a) a conventional mobile TV and (b) a distributed mobile TV combining a handheld unit with an HMD, according to the present invention.

DETAILED DESCRIPTION OF PREFERRED EMBODIMENTS

Figure 1:
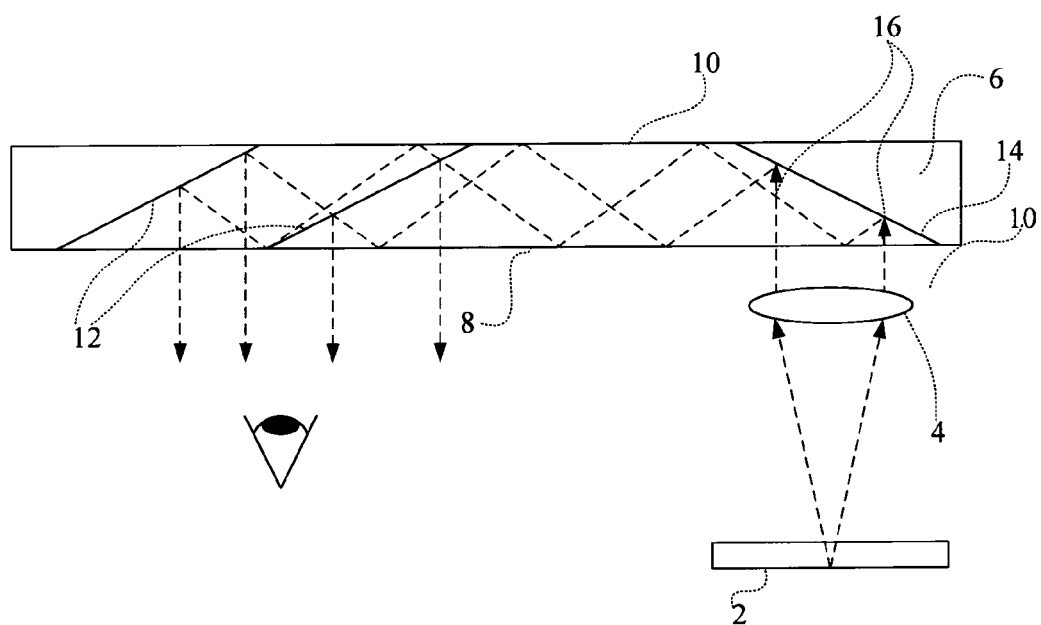

FIG. 1 illustrates a main optical module comprising a display source 2, a collimating device 4, e.g., a lens, and an LOE 6, to form an optical system. Such an LOE typically includes at least two major surfaces 8 and 10 and edges, at least one partially reflecting surface 12 and an optical element 14 for coupling light thereinto. The output waves 16 from the collimating device 4 enter the LOE 6 through its lower surface 8. The incoming waves (vis-à-vis the LOE) are reflected from the surface 14 and trapped in the LOE. The collimating device 4 can easily be integrated into a single mechanical module which may be assembled independently of the LOE, with fairly relaxed mechanical tolerances.

In general, all the potential configurations of the LOEs considered in the publications referred to above, offer several important advantages over alternative compact optics for display applications, which include:
1) The input display source can be located very close to the substrate, so that the overall optical system is compact and lightweight, offering an unparalleled form-factor;
2) In contrast to other compact display configurations, the LOE technology offers flexibility as to location of the input display source relative to the eyepiece. This flexibility, combined with the ability to locate the display source close to the expanding substrate, alleviates the need to use an off-axis optical configuration that is common to other display systems. In addition, since the input aperture of the LOE is much smaller than the active area of the output aperture, the numerical aperture of the collimating lens is much smaller than required for a comparable conventional imaging system. Consequently, a significantly more convenient optical system can be implemented and the many difficulties associated with off-axis optics and high numerical-aperture lenses, such as field or chromatic aberrations, can be compensated for relatively easily and efficiently;
3) The reflectance coefficients of the selectively reflective surfaces in the present invention are essentially identical over the entire relevant spectrum. Hence, both monochromatic and polychromatic light sources may be used as display sources. The LOE has a negligible wavelength-dependence, ensuring high-quality color images with high resolutions;
4) Since each point from the input image is transformed into a plane light wave that is reflected into the eye of the viewer from a large part of the reflecting array, the tolerances on the exact location of the eye can be significantly relaxed. As such, the viewer can see the entire FOV, and the EMB can be significantly larger than in other compact display configurations, and
5) Since a large part of the intensity from the display source is coupled into the substrate, and since a large portion of this coupled energy is "recycled" and coupled out into the eye of the viewer, a display of comparatively high brightness can be achieved even with display sources with low-power consumption.

Figure 2:
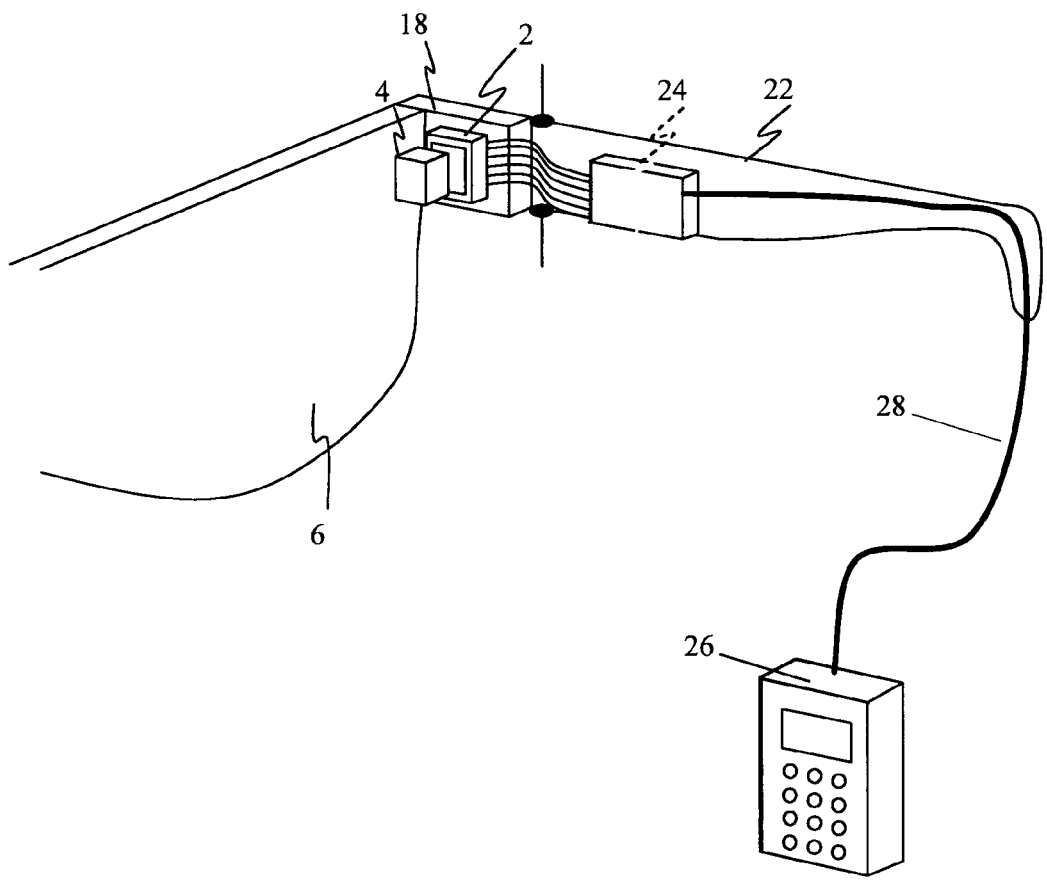

FIG. 2 illustrates a prior art embodiment in which the LOE 6 is embedded in eyeglass frames 18. The display source 2 and the collimating device 4, which includes a folding element, are assembled inside the arm portions 22 of the eyeglass frames next to the edge of the LOE 6. For a case in which the display source is an electronic element, such as a small CRT, LCD or OLED, the driving electronics 24 for the display source may be assembled with the back portion of the arm 22. A handheld unit 26 comprising a power supply, a video source and control interface is connected to arm 22 by a cable 28, which is used for transmitting power, video signals, audio signals and control commands. Naturally, earphones can also be installed in the eyeglasses to enable the exploitation of the audio channel. The handheld unit 26 can be a portable DVD, a cellular phone, a mobile TV receiver, a video games console, a portable media player or any other mobile display device. The unit 26 is referred to as "handheld", since it is usually operated by the user's hand, but it can be any portable device and it can be affixed to the user's belt or located in a pocket, a pouch, a purse or hung on the user's neck.

The embodiment described above can serve in both see-through and non-see-through systems. In the latter case, opaque layers are located in front of the LOE 6. It is not necessary to occlude the entire LOE, just the active area, where the image is visible. In this way, peripheral vision for the user is maintained, replicating the viewing experience of a computer or a television screen, in which such peripheral vision serves an important cognitive function. Alternatively, a variable filter can be placed in front of the system in such a way that the viewer can control the level of brightness of the light emerging from the external scene. This variable filter could either be a mechanically-controlled device, such as a folding filter or two rotating polarizers, an electronically controlled device, or even an automatic device whereby the transmittance of the filter is determined by the brightness of the external background. In addition, the optical combiner which is utilized in the system illustrated in FIG. 2 to project the images onto the user's eyes, is an LOE. This is because the LOE technology is the most appropriate for video eyeglasses applications, however, other technologies can also be used to materialize the required combiner.

Figure 3:
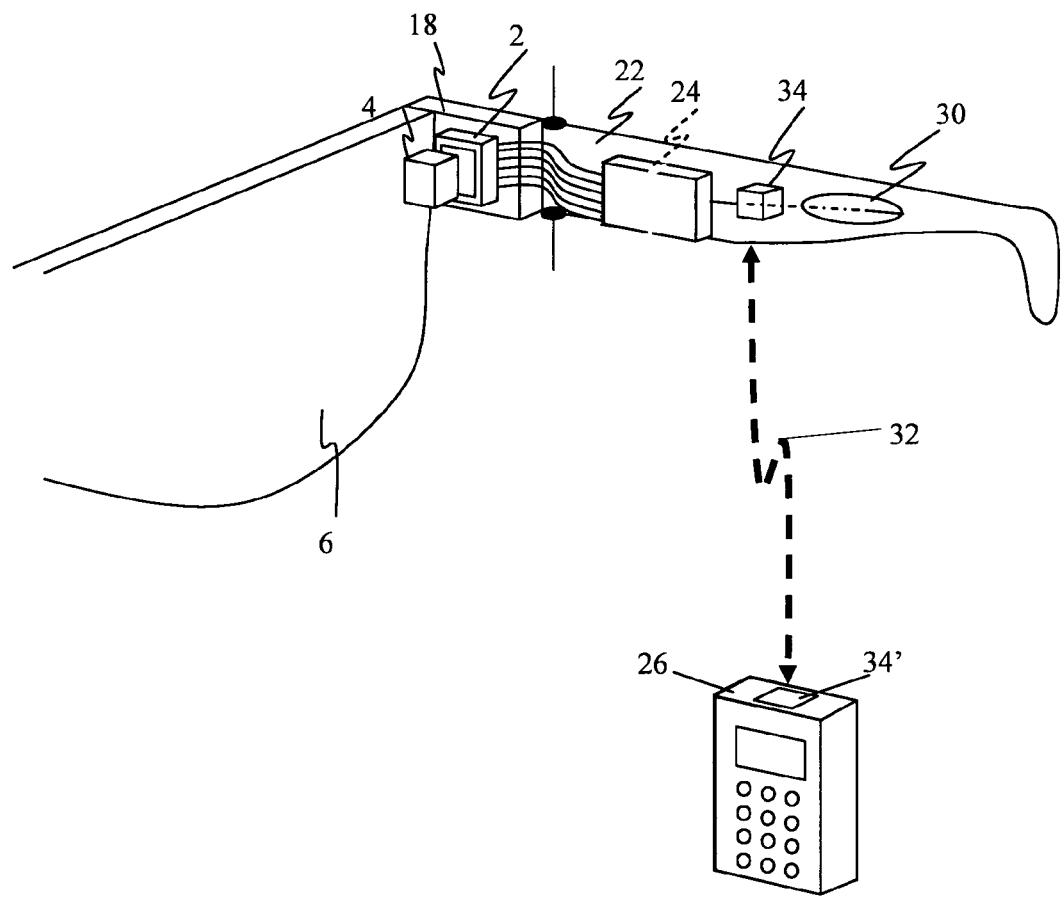

FIG. 3 illustrates an embodiment of the system according to the present invention, in which the connecting cable 28 of FIG. 2 effecting communication between the unit 26 and the driving electronics 24, is eliminated, and in addition to the components which are assembled with the eyeglass frames, a miniature battery 30 is installed in e.g., the back region of the frame 22. For the elimination of the cable 28 of FIG. 2, it is required to introduce a wideband wireless channel 32 between the handheld unit 26 and the HMD 18, in order to transmit the video data. Therefore, wideband wireless devices 34, 34' are installed, respectively, in the eyeglasses frame 22, and in the handheld unit 26. Such a wideband wireless channel 32 will, however, consume a substantial amount of power and, in some cases, require a wireless transmitter on the user's HMD which may be considered a health hazard. Moreover, for many applications, a display resolution of VGA or even of higher qualities, is required. Since it is difficult to supply the required video rate transmission for these resolutions utilizing the present short distance communication technologies, such as Bluetooth, the image quality of the projected display will be severely deteriorated. To eliminate possible ambiguity, hereinafter a "wideband wireless channel" will be referred to as a channel that can transmit live video data with the required rate to achieve an acceptable image quality. Also a "narrowband wireless channel" will be referred to as a channel that does not have sufficient bandwidth to transmit live video but that can transmit data which requires lower rates such as e-mail, SMS and web pages, which do not require live video bandwidth, or to a channel which can transmit the operating commands from the handheld unit to the HMD.

Figure 4:
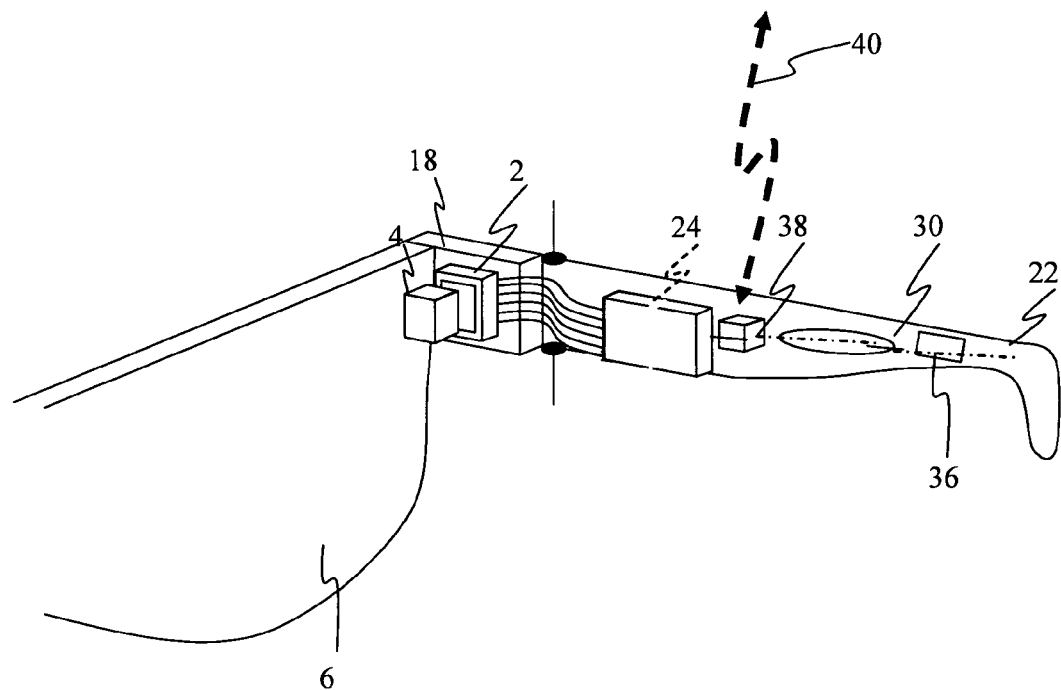

FIG. 4 illustrates a modified version of an entirely autonomous video eyeglasses module in which the handheld unit is eliminated. For independent applications such as DVD players or personal media players, the video source can be any memory device 36, e.g., a memory card, which is installed inside the eyeglasses frame and contains the video content. For other applications such as cellular phones or mobile TVs, a wideband receiver for the mobile TV or a wideband transmitter-receiver 38 for the cellular phone is installed in the eyeglasses frame, to enable the wideband wireless communication channel 40 with an external station. The main drawback of this version is that the control unit is integrated in the eyeglasses module, and as a result, the control of this device is complicated and limited to a few basic operations. Furthermore, for applications wherein transmission is required, such as a 3G mobile phone, the location of the wideband wireless transmitter on the user's head is more hazardous than the location according to the system illustrated in FIG. 3. Moreover, since such a wideband wireless channel will consume a relatively substantial amount of power, a large battery should be installed on the eyeglasses frame, in order to supply the required power for an acceptable duration of time of operation.

Figure 5:
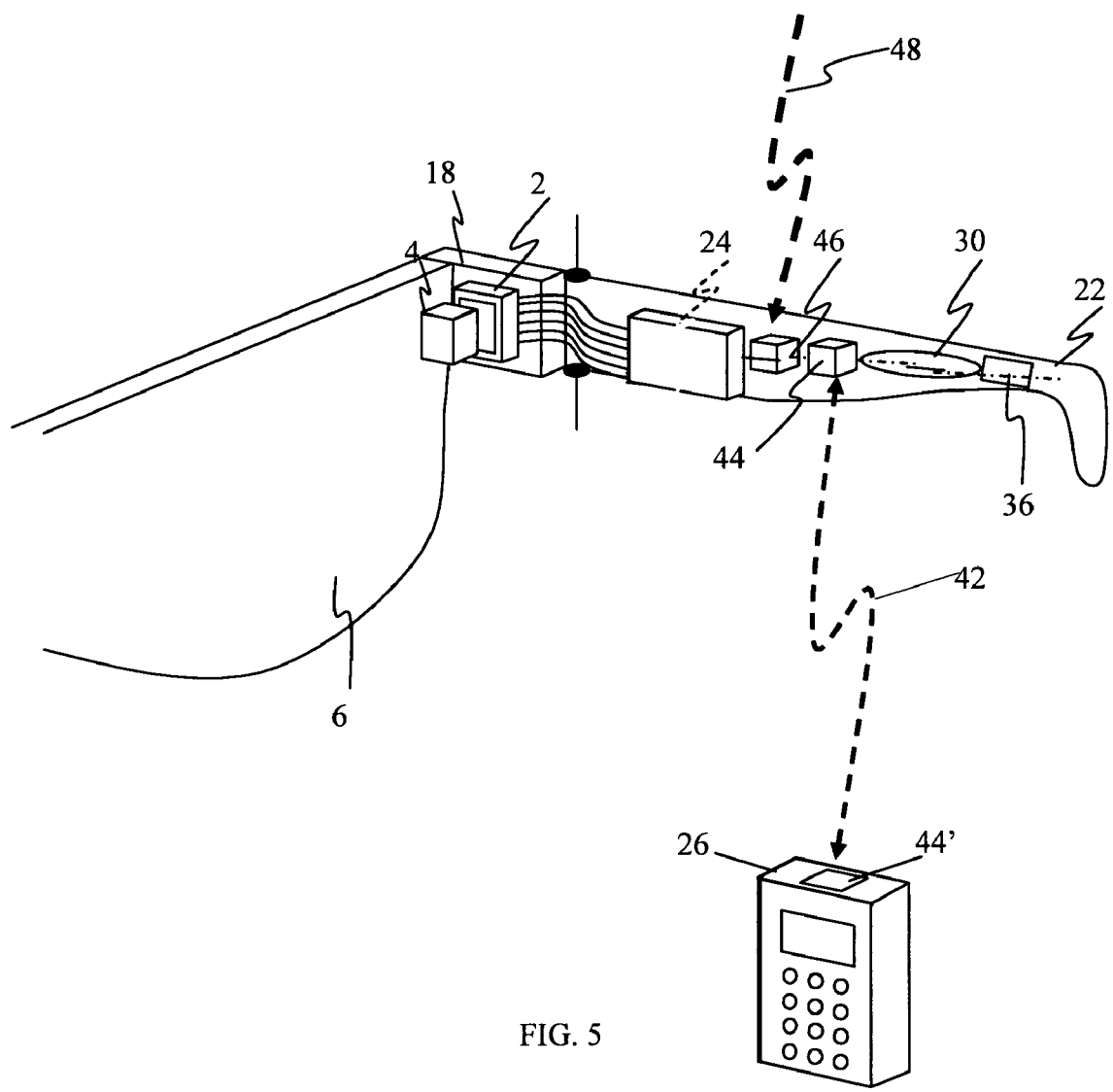

In order to eliminate all the drawbacks described above, a modified version according to the present invention utilizing a distributed-units approach is illustrated in FIG. 5. Accordingly, the functionality between the head-mounted and the handheld units are separated in such a way that:
  there are no cables between the HMD and the handheld unit;
  the video signal source unit is installed in the head-mounted unit;
  all the required transmissions between the HMD and the handheld unit are effected utilizing a narrowband and low-power wireless channel such as Bluetooth;
  the control of the system is operated utilizing the handheld unit, and
  in order to avoid possible health hazard, no high power wideband transmission is performed on the head-mounted unit.

The distributed-units-approach illustrated in FIG. 5, including a narrowband wireless channel 42 between the handheld unit 26 and the HMD 18, is introduced in order to transmit the required data. Therefore, narrowband transmitter-receivers 44, 44' are installed in the eyeglasses frame 22, as well in the handheld unit 26. For wireless applications such as cellular phones or mobile TVs, a wideband receiver 46 is installed in the eyeglasses frame, in order to enable the reception channel 48 to receive video transmission from an external station.

There are some alternatives as to the precise way in which the embodiment illustrated in FIG. 5 can be utilized. The simplest option is to use a single element for one eye. Another option is to use an element and a display source for each eye, projecting the same image, wherein the preferred place for the display sources is next to the temples. A similar option is to project the same image for both eyes but utilizing only one display source which is located between the two glasses, whereby its output is split between the two LOEs. Alternatively, it is possible to project two different parts of the same image, with some overlap between the two eyes, enabling a wider FOV. Yet another possibility is to project two different scenes, one to each eye, in order to create a stereoscopic image. With this alternative, attractive implementations are possible, including 3-dimensional movies, advanced virtual reality, training systems and others.

There are several different configurations which can be materialized using the system illustrated in FIG. 5. The simplest one is where the video source is the narrowband receiver on the HMD. In that case, the user will activate the system utilizing the portable control unit 26 which includes dedicated software that will control the HMD with the narrowband channel for commands only, i.e., brightness, play/stop, audio control, etc., instead of using buttons on the HMD itself. In addition, the portable control unit 26 will transmit, by the narrowband channel, various data such as e-mail, SMS and web pages which do not require live video bandwidth. In a modified application, the video signal source can be a memory device 36, located in the eyeglasses frame. More complicated applications will be wireless devices such as cellular phones or mobile TVs.

Figure 6:
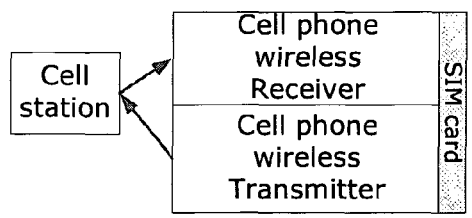
Figure 6:
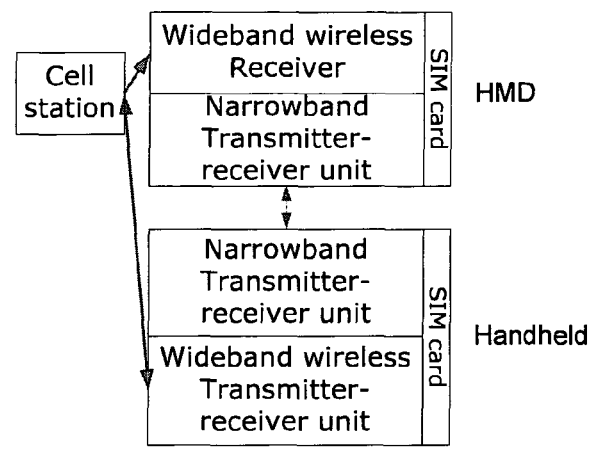

FIGS. 6a and 6b illustrate block diagrams of the communication channels required for cell-phone applications for (a) a conventional cell-phone, and (b) for a distributed cell-phone combining a handheld unit with an HMD, according to the present invention. The conventional cell-phone has a two-way wideband wireless communication channel with its cell base station. The two-way communication is required for identification, billing information, exchange of transmission codes, for re-transmitting requests and, of course, the transmitting of the data itself.

In a distributed configuration, a wideband wireless receiver can be mounted on the HMD along with a narrowband transmitter-receiver. The narrowband channel between the HMD and the handheld unit serves as a relay between the HMD and the wideband wireless transmitter on the handheld unit. All the wideband multimedia data will be fed directly to the HMD via the wideband receiver, thus avoiding a cable or a wideband transmittance between the separated units, and all the wideband RF transmission will be effected from the handheld unit, thus avoiding a potential health hazard of an RF transmitter on the user's head. In addition, all the commands needed to control the HMD and its screen, namely, the cursor, menus, display brightness, audio volume etc., will be transmitted from the handheld unit over the narrowband channel to the HMD, enabling regular operation of the distributed units. Also transmissions from the HMD to the external station, such as a cell station, will be transmitted to the handheld unit by the narrowband channel and from the handheld unit, which serves as a relay device, will be transmitted using the wideband channel to the external station.

FIGS. 7a and 7b illustrate block diagrams of the communication channels required for mobile TV applications for (a) a conventional mobile TV, and (b) for a distributed mobile TV combining a handheld unit with an HMD, according to the present invention. The conventional mobile TV configuration consists of a TV receiver coupled with an optional uplink channel. The uplink channel, which can also be a conventional cell phone, is required for transferring billing information, subscription to the desired channels package, receiving encryption codes and more. In the distributed mobile TV configuration, the TV receiver will be mounted on the HMD, thus avoiding the need for a cable for the video data or a wideband transmittance between the separated units. The handheld unit will interact with the TV service provider for the channels subscription and encryption codes via a wideband connection which can utilize conventional cell channels. The required information will then be transmitted to the HMD over the narrowband channel. As described above, all the commands required to control the HMD and its screen, such as the cursor, menus, display brightness, audio volume, channel selection etc., will be transmitted from the handheld unit over the narrowband channel to the HMD.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An electro-optical system, including at least two spaced-apart units, comprising:
    a first unit including a head-mounted display (HMD), having a video signal source, a display source for displaying video signals from the display source, an optical module for projecting video signals from the display source into a user's eye, a driving electronic module, a power supply, and a wideband receiver for receiving information from an external station; and
    a second unit including a portable control and a wideband transmitter-receiver channel for two-way communication with an external station, the two spaced-apart units communicating by a narrowband wireless channel.

2. The optical system according to claim 1, wherein said optical module comprises a collimating lens and an optical combiner.

3. The optical system according to claim 2, wherein said optical combiner comprises a light-transmitting substrate having at least two major surfaces parallel to each other and two edges, an optical element for coupling light into said substrate by total internal reflection, and at least one partially reflecting surface located in said substrate, which surface is non-parallel to the major surfaces of said substrate.

4. The optical system according to claim 1, wherein said video signal source is a memory device.

5. The optical system according to claim 1, wherein said video signal source is a narrowband wireless receiver.

6. The optical system according to claim 1, wherein said video signal source is constituted by said wideband receiver.

7. The optical system according to claim 1, wherein said portable control further comprises a wideband transmitter-receiver.

8. The optical system according to claim 1, wherein said portable control is a cellular phone.

9. The optical system according to claim 1, wherein said portable control is a portable DVD.

10. The optical system according to claim 1, wherein said portable control is a portable media player.

11. The optical system according to claim 1, wherein said portable control is a video games console.

12. The optical system according to claim 1, wherein said portable control is a mobile TV control.

13. The optical system according to claim 1, wherein said portable control includes dedicated software for controlling the HMD with the narrowband channel.

14. The optical system according to claim 1, wherein said video signal source feeds the data to said display source.

15. The optical system according to claim 1, wherein said HMD is embedded in an eyeglasses frame.

16. The optical system according to claim 15, wherein said HMD comprises two units for projecting the video signals into both eyes of the user.

17. The optical system according to claim 15, wherein said HMD projects the same video signals to both of the user's eyes utilizing one display source which is located between two glasses of said eyeglasses.

18. The optical system according to claim 15, wherein said HMD projects two different parts of the same video signals, with some overlap between both of the user's eyes.

19. The optical system according to claim 15, wherein said HMD projects two different scenes, one to each of the user's eyes, in order to form a stereoscopic image.

20. The optical system according to claim 1, wherein a software is installed in said portable control dedicated for operating said HMD.

21. The optical system according to claim 1, wherein the HMD transmits information to an external station by transmitting the information to the second unit, using the narrowband channel, the second unit, acting as a relay device, transmitting the information to the external station using the wideband channel.

* * * * *